United States Patent [19]
Aoshima et al.

[11] Patent Number: 5,130,182
[45] Date of Patent: Jul. 14, 1992

[54] WATERPROOF RUBBER SHEET

[75] Inventors: Masashi Aoshima; Hironobu Shigematsu; Tatsuo Sassa, all of Osaka, Japan

[73] Assignee: Sumitomo Chemical Co., Ltd., Osaka, Japan

[21] Appl. No.: 755,773

[22] Filed: Sep. 6, 1991

[30] Foreign Application Priority Data

Sep. 14, 1990 [JP] Japan .................. 2-244243

[51] Int. Cl.⁵ .................. B32B 27/08; C08J 5/15; C08L 26/16
[52] U.S. Cl. .................. 428/212; 428/517; 428/519; 525/240
[58] Field of Search .................. 428/517, 519, 212; 525/240

[56] References Cited

U.S. PATENT DOCUMENTS

4,310,367 1/1982 Berejka .................. 525/240
4,311,807 1/1982 McCullough, Jr. et al. ........ 525/197

FOREIGN PATENT DOCUMENTS

52-68273 6/1977 Japan .
63-264639 6/1988 Japan .

Primary Examiner—P. C. Sluby
Attorney, Agent, or Firm—Birch, Stewart, Kolasch & Birch

[57] ABSTRACT

A fusion bonded waterproof sheet having a first ethylene-α-olefin rubber layer which has a high crosslinking rate and is changed to a crosslinked layer and a second ethylene-α-olefin rubber layer which has a low crosslinking rate and is changed to a partially crosslinked layer, the crosslinking of both sheets being carried after compositing and integrating them, which sheet has good fusion bondability and good bond strength at high temperature.

5 Claims, 1 Drawing Sheet

WATERPROOF RUBBER SHEET

BACKGROUND OF THE INVENTION

1. Field of the Invention

The present invention relates to a waterproof rubber sheet. More particularly, the present invention relates to a waterproof rubber sheet comprising ethylene-α-olefin rubbers which are useful in the waterproofing of buildings or the water-tightening of water reservoirs, irrigation canals and the like.

2. Description of the Related Art

Since an ethylene-α-olefin rubber has good heat resistance, weather resistance, ozone resistance, cold resistance and chemical resistance, it is widely used in the waterproofing sheet fields, for example, waterproofing of building roofs, the water-tightening of rivers, ponds, irrigation canals or the prevention of pollution of ground water with harmful substances which are liberated from industrial wastes.

In waterproofing sheet fields, sophisticated adhesion techniques are required. Since the ethylene-α-olefin rubber is a non-polar rubber, its adhesion is more difficult than other rubbers such as natural rubbers, styrene-butadiene rubbers, butyl rubbers, chloroprene rubbers, chlorosulfonated polyethylene and the like.

Since an adhesive used for adhesion is generally of the organic solvent type, it has various problems in that it is flammable or dangerous for users' health or its adhesion force is greatly influenced by environmental conditions after the application of the adhesive (e.g. weather, climate, temperature, keeping time, etc.). Because of such a situation, a fusion bondable waterproof sheet attracts attention.

As the fusion bondable waterproof sheet, a polyvinyl chloride sheet and a thermoplastic elastomer sheet are well-known. The fusion bondable waterproof sheet is adhered to a substrate by melting the sheet by heating, contact bonding the sheet to the substrate and cooling to solidify the sheet. In the case of the rubber sheet, since the rubber is crosslinked, the sheet cannot be molten and deformed so that fusion bonding of the rubber sheet is said to be difficult.

To fusion bond the crosslinked rubber sheet, a thermoplastic resin layer is inserted as a fusion bondable layer between the crosslinked rubber sheets. However, the resin has drawbacks such as poor flexibility, and elongation and contraction due to temperature change according to the seasons. In addition, it is a big problem in the production of practical products to composite the thermoplastic resin as the fusing bondable layer with a part of the crosslinked rubber sheet. Therefore, a the fusion bondable waterproof rubber sheet is not generally used.

Japanese Patent Application No. 99416/1987 discloses a method for producing a waterproof sheet by fusion bonding an uncrosslinked sheet to a substrate and then crosslinking the sheet at room temperature. However, since the fusion bonding is carried out in a place where the waterproof is laid, there are various problems such that it is difficult to prevent crosslinking of the sheet in a variable period from the production of the uncrosslinked sheet to the waterproof laying, and that the crosslinking rate is low at room temperature or that the rubber sheet has small strength during application, so that breakage, waviness due to plastic deformation, size change, or deformation and self adhesion occur during storage.

SUMMARY OF THE INVENTION

An object of the present invention is to provide a waterproof sheet having fusion bondability and good bonding strength, even at high temperature, as well as good physical properties of the sheet itself.

According to the present invention, there is provided a fusion bondable waterproof sheet comprising a first ethylene-α-olefin rubber layer which has a high cross-linking rate and is changed to a crosslinked layer and a second ethylene-α-olefin rubber layer which has a low cross-linking rate and is changed to a partially crosslinked layer, the crosslinking of both sheets being carried after compositing and integrating them.

Hitherto, a composite waterproof sheet comprising a crosslinked layer and a non-crosslinked layer is known, but the waterproof sheet of the present invention has a completely different structure from the known composite waterproof sheet. That is, the conventional non-crosslinked layer acts only as a sticking layer, whereas in the present invention, the second layer is partially crosslinked to improve the physical properties and fusion bondability and to prevent sticking and composited with the crosslinked first layer.

In view of the production step, the conventional uncrosslinked layer is composited with the crosslinked sheet, while in the present invention, uncrosslinked first and second layers are composited and then they are cross-linked to form the crosslinked layer and the partly cross-linked layer simultaneously.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
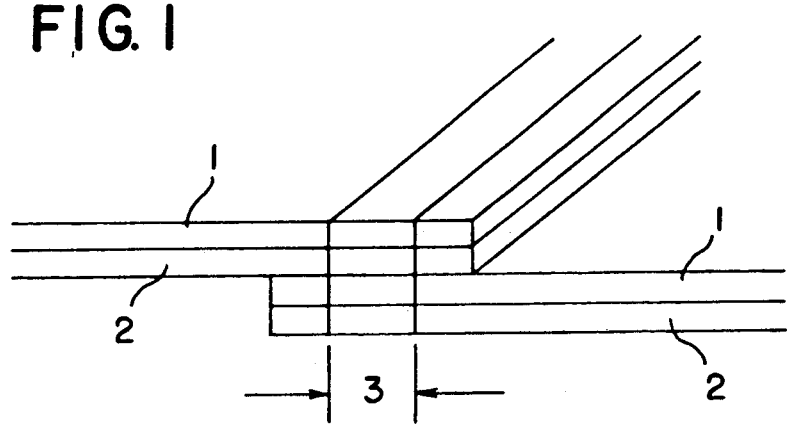
FIGS. 1 and 2 illustrate the preparation and testing procedures in the 180 degree peeling test, respectively.

The first ethylene-α-olefin layer having the high crosslinking rate and the second ethylene-α-olefin layer having the low crosslinking rate are each molded by an extruder or a calender roll and then composited and integrated, or they are simultaneously molded and composited using a two-color extruder.

In addition to the ethylene-α-olefin rubber and a crosslinking agent, each of the first and second layers may contain at least one of additives in a suitable amount. Examples of the additives are carbon black, a white filler (e.g. clay, talc, calcium carbonate, barium sulfate, silica, titanium white, etc.), a process oil, a processing aid, an activator, a tackifier, a pigment, an anti-aging agent, a flame retardant, a crosslinking accelerator, a crosslinking aid and the like. If desired, at least one other rubber such as a natural rubber, a styrene-butadiene rubber, a butyl rubber, a chloroprene rubber and an acrylonitrile-butadiene rubber may be added to reduce a cost of the waterproof sheet or to improve some properties such as flame retardance or oil resistance. If necessary, thermoplastic polymers such as polyethylene, ethylene-vinyl acetate copolymer and the like may be added.

The components are mixed by a conventional mixing apparatus such as a Banbury mixer, a kneader or rolls.

One of the most important features of the waterproof sheet of the present invention resides in that the crosslinking rates of the first and second layers are made different. The crosslinking rates of the layers are adjusted mainly by selection of kinds and amounts of the ethylene-α-olefin and of the crosslinking agent, the cross-linking accelerator and the crosslinking aid. Although the crosslinking rate may be influenced by the kinds and amounts of filler and/or the process oil, the degree of adjustment is small and such is not a useful way when the crosslinking rates are adjusted to make a positive difference as in the case of the present invention.

As the crosslinking agent, any of crosslinking agents which are conventionally used for crosslinking the ethylene-α-olefin rubber can be used. Examples of the crosslinking agent are sulfur, peroxides (e.g. dicumyl peroxide, benzoyl peroxide, α,α'-bis(tert.-butylperoxy-m-isopropyl)benzene, and quinoids (e.g. tetrachlorobenzoquinone, benzoquinonedioxime), etc. Among them, sulfur is preferred.

When sulfur is used as the crosslinking agent, the crosslinking rates of the first and second layers can be adjusted by the kind and amount of the crosslinking accelerator to be added to each layer. In general, the cross-linking accelerator having a larger acceleration effect is contained in a larger amount in the first layer than in the second layer. The amount of the accelerator is determined so as to prevent generation of bloom or scorch.

When a peroxide is used as the crosslinking agent, the crosslinking rates of the layers may be changed by the kinds of the oxides utilized. In the production of a waterproof sheet, a peroxide is not generally used since oxygen present in the crosslinking step or oxygen contained in the fillers may interfere with the crosslinking and the peroxide has a malodor. However, the use of a peroxide for crosslinking is not excluded. In some cases where coloring or discoloration by crosslinking with sulfur should be avoided, for example, in the production of a colored waterproof sheet a peroxide is used. Further, it is possible to use different cross-linking agents in the first and second layers, for example, sulfur in the first layer and a peroxide in the second layer.

It is important to differentiate the crosslinking rates of the first and second layers by the selection of the kinds of the ethylene-α-olefin rubbers.

It is well known that the crosslinking of the ethylene-α-olefin rubber with sulfur may be influenced by the kind and amount of a third component contained in the rubber. That is, a rubber comprising ethylidene norbornene (ENB) as the third component has a larger crosslinking rate than that comprising dicyclopentadiene (hereinafter referred to as "DCPD") as a third component, or the rubber containing a lager amount of the third component has a larger crosslinking rate than that containing a smaller amount of the third component. Then, the ethylene-α-olefin rubber comprising ENB is used as the first layer having the larger crosslinking rate, while the ethylene-α-olefin rubber comprising DCPD is used as the second layer having the smaller crosslinking rate. When the same third component is used, the ethylene-α-olefin rubber containing the third component in a larger amount is used as the first layer, while the ethylene-α-olefin rubber containing the third component in a smaller amount is used as the second layer.

As stated above, the selection of the kind and amount of the crosslinking accelerator will differentiate the crosslinking rate. As is well known, the crosslinking accelerator melts when heated to a crosslinking temperature and quickly migrates. When the crosslinking rates of the first and second layers are differentiated by the selection of the crosslinking accelerator, the accelerator migrates from one layer to the other and its concentrations in the both layers are unified so that intended difference of the crosslinking rate is not often achieved since a thickness of the waterproof sheet in general is as small as several mm or less. Preferably, the crosslinking rates of the layers are differentiated by the use of different ethylene-α-olefin rubbers as the first and second layers.

The crosslinking rates of the first and second layer can be measured, for example, by the method described in "Rubber Testing Methods" (new edition) edited by the Incorporated Body, Nippon Rubber Association (1980), 202–225. One of the most commonly used methods is a method using a vibration type vulcanization testing apparatus (hereinafter referred to as "rheometer") which monitors progress of crosslinking by a torque value required for oscillating a rotor. As shown in FIG. 2–14 of page 212 of "Rubber Testing Methods" (ibid.), a relation curve between time and torque is drawn, and then a crosslinking rate is calculated as a numerical value from an initial slope of the curve or an optimum vulcanizing time ($t'_{c(90)}$) which is a time for achieving a 90 % crosslinking degree.

After compositing and integrating the uncross-linked layers, they are heated and crosslinked by a per se conventional method such as an oven, a vulcanizer or rotary heating drum. Conditions such as temperature and crosslinking time are adjusted so that the first layer is crosslinked and the second layer is partly crosslinked. When the heating time in the heating apparatus is fixed in view of the heating temperature and productivity, the cross-linking rates of the first and second layers are suitably adjusted by the composition of the ethylene-α-olefin rubbers. In general, a heating time is set to achieve at least 75% of $t'_{c(90)}$ of the first layer measured at a heating and crosslinking temperature. The compositions of the first and second layers and the heating and crosslinking conditions are so selected that the crosslinking degree of the second layer is 50% or less, preferably 20% or less in the above heating time.

Examples of the α-olefin in the ethylene-α-olefin rubber to be used in the present invention are propylene, 1-butene, 1-pentene and 1-hexene. Among them propylene is preferred.

Preferably, in the ethylene-α-olefin rubber, at least one non-conjugated diene is copolymerized. Examples of the non-conjugated diene are dicyclopentadiene, ethylidene norbornene, vinylidene norbornene, 1,4-hexadiene, etc.

When the peroxide is used as the crosslinking agent, the non-conjugated diene is not necessarily copolymerized. When sulfur is used as the crosslinking agent, the non-conjugated diene is preferably copolymerized with the ethylene-α-olefin rubber.

As stated above, the crosslinking rate is varied with the kind and amount of the non-conjugated diene, it is preferred to select the ethylene-α-olefin rubber which is suitable for the desired crosslinking rate. As already explained, the ethylene-α-olefin rubber comprising ENB is preferably used as the first layer, while the ethylene-α-olefin rubber comprising DCPD is preferably used as the second layer.

In general, a content of ethylene in the ethylene-α-olefin rubber is from 50 to 95% by weight, and a content of the non-conjugated diene is 5 to 50 in terms of an iodine value.

As the second layer, the ethylene-α-olefin rubber having a high ethylene content such as 70 to 95% by weight is often used in order to achieve the good physical properties in spite of the partly crosslinked state. One of other measures to improve the physical properties of the partly crosslinked rubber is the use of an ethylene-α-olefin rubber having a high molecular weight. In this case, however, processability of the rubber for producing a thin sheet to provide the waterproof sheet such as flowability of the rubber in the calendering and extrusion, smoothness and uniform thickness of the produced sheet, and the like are in general deteriorated. Thus it is preferred to use the ethylene-α-olefin rubber having the high ethylene content.

The crosslinking agent is used in an amount of 0.3 to 5 parts by weight per 100 parts by weight of the ethylene-α-olefin rubber.

When sulfur is used as the crosslinking agent, as the crosslinking accelerator, at least one of guanidines, thioureas, thiazoles, dithiocarbamates and thiurams can be used in an amount of 0.1 to 5 parts by weight per 100 parts by weight of the rubber.

When the peroxide is used as the crosslinking agent, as the crosslinking accelerator, at least one of methacrylates, oximes, maleimides and triallylisocyanates can be used in an amount of 0.3 to 5 parts by weight per 100 parts by weight of the rubber.

The kind and amount of the accelerator are determined according to the intended crosslinking rate, blooming stability and scorch stability.

Since the composite sheet produced by the method of the present invention has fusion bondability and is crosslinked, not only the sheet has good physical properties but also its adhesion strength is further improved by the progress of the crosslinking in the second layer and also at an adhered interface between the first and second layers by the heat during fusion bonding.

The fusion boding is effected by heating a fusion bonded part of the waterproof sheet with a hot air or IR light for heating to a temperature of 200° to 600° C. and pressing the bonded part. The heating temperature, heating time and pressing pressure are determined by taking the desired adhesion force, degradation of the rubber and processing speed of fusion bonding into consideration.

The waterproof sheet includes a multilayer sheet having a structure of, for example a colored crosslinked layer/a black crosslinked layer/a partly crosslinked layer.

PREFERRED EMBODIMENTS OF THE INVENTION

The present invention will be illustrated by the following Examples, which will not limit the scope of the present invention.

Examples and Comparative Examples

According to each of the formulations (1) to (6) shown in Table 1, an ethylene-propylene rubber was compounded with additives such as a filler, a process oil, etc. in a Banbury mixer and then, to the mixture, a crosslinking agent and a crosslinking accelerator were added on 10 inch rolls. From the obtained compound, a sheet having a thickness of 1 mm was molded with an extruder equipped with a T die. As a criterion of a crosslinking rate of each compound, $t'_{c(90)}$ is shown in Table 1.

Table 2 shows properties of the ethylene-propylene rubbers used in the compounds (1) to (6).

In Examples and Comparative Examples, the crosslinking degrees of the first and second layers were controlled by adjustment of the crosslinking time.

EXAMPLE 1

Using the sheet of the compound (1) as the first layer and the sheet of the compound (4) as the second layer, a composite sheet was produced and crosslinked under such conditions that the first layer was suitably crosslinked while the second layer was half crosslinked (at 180° C. for 3 minutes).

The physical properties of the composite sheet are shown in Table 3.

Tensile strength at break and elongation at break are measured according to JIS K-6301 by blanking a No. 3 dumbbell sample and pulling the sample at a rate of 500 mm/min.

Figure 2:
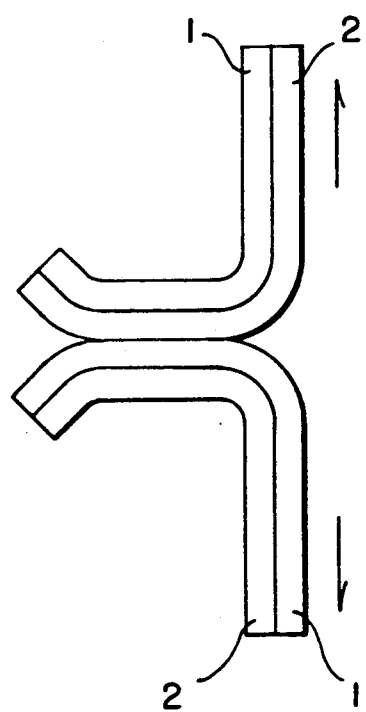

Peeling strength is measured by laminating a pair of the composite sheets with contacting the second layer of the upper sheet to the first layer of the lower sheet as shown in FIG. 1, fusion bonding them with an automatic hot air fusion bonding machine at a hot air temperature of 300° C. under a pressure of 25 kg/cm² at a bonding rate of 0.7 m/min. with a bonding width of 3 cm, and then peeling the bonded sheets in the directions shown in FIG. 2 at a peeling rate of 50 mm/min. As seen from the results of Table 3, the sheet had good fusion bondability.

EXAMPLE 2

In the same manner as in Example 1 but using the sheet of the compound (6) as the second layer, the composite sheet was produced and the tests were carried out.

As seen from the results of Table 3, the sheet had good fusion bondability.

EXAMPLE 3

In the same manner as in Example 1 but using the sheet of the compound (3) as the second layer, the composite sheet was produced and the tests were carried out.

As seen from the results of Table 3, the sheet had good fusion bondability.

COMPARATIVE EXAMPLE 1

In the same manner as in Example 1 but using the sheet of the compound (1) as the first layer and the sheet of the compound (2) as the second layer, the composite sheet having a small difference of the crosslinking rates between the first layer and the second layer was produced and the tests were carried out.

COMPARATIVE EXAMPLE 2

In the same manner as in Example 1 but using the sheet of the compound (1) as the first layer and the sheet of the compound (5) as the second layer, the composite sheet was produced and the tests were carried out.

As seen from the results of Table 3, the sheet had low fusion bonding strength.

COMPARATIVE EXAMPLE 3

Using the sheet of the compound (1) as the first layer and the sheet of the compound (4) as the second layer and crosslinking the sheet under conditions that the second layer was further cross linked at 180° C. for 8 minutes, the composite sheet was produced and the tests were carried out.

The reason why the ethylene-propylene rubber containing ENB as the third component and having a high ethylene content was used was that the physical properties of the crosslinked first layer were increased.

As shown in Table 3, it is understood that the use of ethylene-propylene rubber having a high ethylene content as the second layer is preferred from the results of Examples 1 and 2.

From the results of Example 3, it is understood that the change of the third component from DCPD to ENB can achieve the difference of the crosslinking rates between the first and the second layers and the sheet having fusion bondability can be obtained.

As seen from the results of Comparative Examples 1 and 2, when both the first and second layers are completely crosslinked, the sheets are not practically fusion bonded. As in Comparative Example 2, when the second layer is uncrosslinked, the sheet has a low fusion bonding strength and the second layer has a slightly sticky surface which will be a big problem in winding and storing the sheet. Such sheet has a low practical value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Components (wt. parts) | Compound No. | | | | | |
|---|---|---|---|---|---|---|
| | (1) | (2) | (3) | (4) | (5) | (6) |
| Ethylene-propylene rubber A | 100 | — | — | — | — | — |
| Ethylene-propylene rubber B | — | 100 | 100 | — | — | — |
| Ethylene-propylene rubber C | — | — | — | 100 | 100 | — |
| Ethylene-propylene rubber D | — | — | — | — | — | 100 |
| Stearic acid | 1 | 1 | 1 | 1 | 1 | 1 |
| Zinc oxide | 5 | 5 | 5 | 5 | 5 | 5 |
| HAF Black | 70 | 70 | 70 | 70 | 70 | 70 |
| Surface-treated $CaCO_3$ | 70 | 70 | 70 | 70 | 70 | 70 |
| Paraffin oil | 40 | 40 | 40 | 40 | 40 | 40 |
| Aliphatic hydrocarbon resin tackifier | 10 | 10 | 10 | 10 | 10 | 10 |
| Calcium oxide | 5.0 | 5.0 | 5.0 | 5.0 | 5.0 | 5.0 |
| BZ (*1) | 2.0 | 2.0 | 0.8 | 0.8 | * | 0.8 |
| Sokushinol TRA (*2) | 0.3 | 0.3 | * | * | * | * |
| Sokushinol M (*3) | 1.5 | 1.5 | * | * | * | * |
| Sokushinol TT (*4) | * | * | 0.4 | 0.4 | * | 0.4 |
| Sokushinol DM (*5) | * | * | 2.0 | 2.0 | * | 2.0 |
| Sulfur | 0.8 | 0.8 | 0.8 | 0.8 | * | 0.8 |
| $t'_{c(90)}$ (min.) (*6) | 3.8 | 3.9 | 5.4 | 8.7 | — | 9.1 |

Note:
(*1) to (*5) Crosslinking accelerators manufactured by Sumitomo Chemical Co., Ltd.
(*6) Measured with an ASTM-100 type oscillating disc rheometer (manufactured by Toyo Seiki Co., Ltd.) at 180° C.

TABLE 2

| Ethylene-propylene rubber | A | B | C | D |
|---|---|---|---|---|
| Ethylene content (wt. %) | 80 | 65 | 85 | 50 |
| $ML_{1+4}$, 100° C. | 70 | 90 | 90 | 90 |
| Iodine value (g/100 g) | 15 | 12 | 15 | 15 |
| Third component | ENB | ENB | DCPD | DCPD |

TABLE 3

| | Example No. | | | Com. 1 | Com. 2 | Com. 3 |
|---|---|---|---|---|---|---|
| | 1 | 2 | 3 | | | |
| Compound of 1st layer | (1) | (1) | (1) | (1) | (1) | (1) |
| Compound of 2nd layer | (4) | (6) | (3) | (2) | (5) | (4) |
| Crosslinking conditions (°C. × min.) | 180 × 3 | ← | ← | ← | ← | ← |
| Crosslinked state of 1st layer | Complete | ← | ← | ← | ← | ← |
| Crosslinked state of 2nd layer | Partial | ← | ← | ← | No *1) | ← |
| Tensile strength at break of the composite sheet (kg/cm²) | 69 | 61 | 85 | 98 | 41 | 124 |
| Elongation at | 650 | 520 | 610 | 540 | 580 | 440 |

TABLE 3-continued

| | Example No. | | | | | |
|---|---|---|---|---|---|---|
| | 1 | 2 | 3 | Com. 1 | Com. 2 | Com. 3 |
| break of the composite sheet (%) | | | | | | |
| Peeling strength of the bonded sheets (kg/inch) | 15.2 | 11.9 | 5.6 | 1.5 | 0.8 | 1.1 |
| Peeling state *2) | M | M | I | I | M | I |

Note:
*1) Slightly sticky.
*2) M: Breakage of the material. I: Peeling at the interface.

What is claimed is:

1. A fusion bonded waterproof sheet comprising
a first ethylene-α-olefin rubber layer which is thermally crosslinked to achieve at least 75% of an optimum vulcanization time $t'_{c(90)}$ which is a time for achieving a 90% crosslinking degree, and
a second ethylene-α-olefin rubber layer which is crosslinked to achieve 50% or less of the optimum vulcanizing time $t'_{c(90)}$.

2. The fusion bonded waterproof sheet according to claim 1, wherein said second layer comprises an ethylene-α-olefin rubber having an ethylene content of 70 to 95% by weight.

3. The fusion bonded waterproof sheet according to claim 1, wherein said ethylene-α-olefin rubbers of said first and second layers comprise a non-conjugated diene as a third component.

4. The fusion bonded waterproof sheet according to claim 1 wherein said first layer comprises an ethylene-α-olefin rubber comprising ethylidene norbornene as a third component, and said second layer comprises an ethylene-α-olefin rubber comprising dicyclopentadiene as a third component.

5. The fusion bonded waterproof sheet according to claim 1, wherein said ethylene-α-olefin rubber is an ethylene-propylene rubber.

* * * * *